W. BEERS.

Assignor, by mesne assignments, to B. S. PRAY, trustee.

Axle for Vehicles.

No. 8,384. Reissued Aug. 20, 1878.

WITNESSES.

Saml. Delpeau

Geo. H. Earl

INVENTOR.

W. Beers

Per Brown Bros attorneys.

N. PETERS, PHOTO-LITHOGRAPHER, WASHINGTON, D. C.

UNITED STATES PATENT OFFICE.

WHEELER BEERS, OF BRIDGEPORT, CONNECTICUT, ASSIGNOR, BY MESNE ASSIGNMENTS, TO BENJAMIN S. PRAY, (TRUSTEE,) OF BOSTON, MASS.

IMPROVEMENT IN AXLES FOR VEHICLES.

Specification forming part of Letters Patent No. 48,895, dated July 25, 1865; Reissue No. 8,384, dated August 20, 1878; application filed May 6, 1878.

*To all whom it may concern:*

Be it known that I, WHEELER BEERS, of Bridgeport, in the county of Fairfield, in the State of Connecticut, have invented a certain new and useful Improvement in Axles for Vehicles, of which the following is a specification:

The object of this invention is to allow the hub and wheel to play longitudinally upon the axle, and in a manner to protect the wheel against undue strains and lateral jars or concussions, and thus against wear and tear, as also the body of the vehicle against racking.

This improvement in carriage-axles consists in the combination, with the axle and its box, of two springs, which are situated at opposite ends of the box, with the intervening part of the box bearing on the axle, and are there confined by shoulders of the axle and the box, so as to act in opposite directions against the thrusts of the axle-box on the axle or of the axle within the axle-box.

Figure 1:
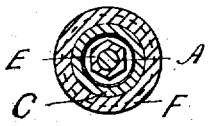
Figure 2:
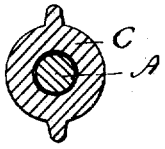
Figure 3:
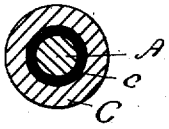
Figure 4:
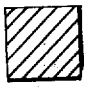
Figure 5:
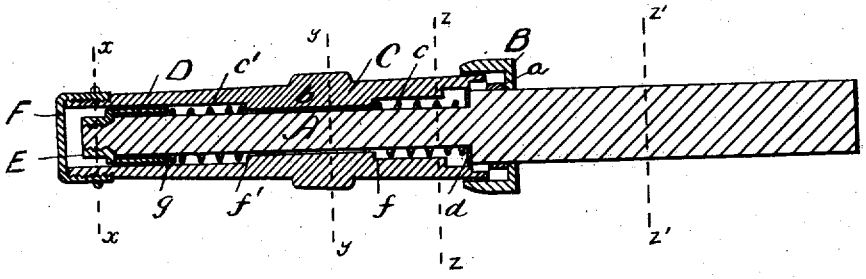
Figure 6:
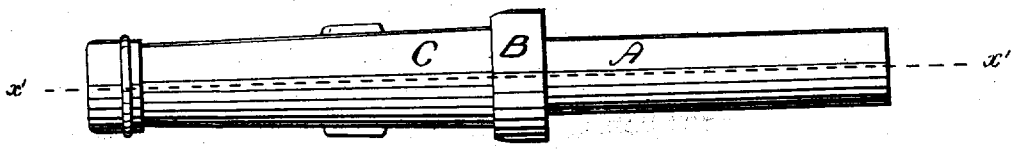

In the accompanying plate of drawings the present invention is illustrated, Figures 1, 2, 3, and 4 being transverse sections, respectively, on lines *x x*, *y y*, *z z*, *z' z'* of Fig. 5, which is a longitudinal section on line *x' x'* of Fig. 6, which is an exterior view of the axle and its box.

In the drawings, A represents a carriage-axle, having at its inner end a chambered collar, B, which collar receives the inner end of the hub or axle-box C of a carriage-wheel.

*a* is a washer, fitted on the axle A and lying within the axle-collar B. (See Fig. 5.) This washer *a* serves as a stop to the inner end of the axle-box C when it is moved into the collar B.

*b* is a circumferential projection within the box C, and intermediate of its two ends. This projection *b* of the axle-box C fits and bears upon the axle A, and at each end thereof there is an annular space between the box and axle, and in each of these spaces there is a spiral spring, *c c'*, both encircling the axle, and at their ends, which are toward each other, resting against a shoulder, *f f'*, of the axle-box, which shoulders are at the end of the circumferential projection *b*.

The outer end of the spring *c*, which is the spring the nearer of the two springs to the inner end of the axle, bears against the inner shoulder, *f*, of the box-projection *b*, and the inner end of the said spring *c* bears against a shoulder, *d*, at the inner end of the axle.

The inner end of the spring *c'*, which is the spring at the outer end of the axle, bears against the outer shoulder, *f'*, of the box-projection *b*, and the outer end of the said spring *c'* bears against the inner end or shoulder, *g*, of a tube or thimble, D, which fits the outer part of the axle A, and is there secured by a screw-nut, E. On this tube or thimble D the outer end of the axle-box C bears.

F is a screw-nut on outer end of box C, and closing the opening of such end.

From the above description it will be seen that the box C is allowed a play on the axle both toward and away from the body of the vehicle, and that in this play of the box the springs *c c'* act in opposite directions, to prevent jars or concussions of the wheel, at the same time securing an easy and gradual play of the box; and, further, that the box between the said springs has a bearing upon the axle. In this play of the axle-box on the axle the inner spring, *c*, is supported against such thrusts by the inner shoulder, *d*, of the axle and the outer spring, *c'*, through the shoulder *g* of the thimble D, by the screw-nut E of the axle.

I do not claim, broadly, the application of springs to an axle to resist thrusts in both directions; but What I do claim, and desire to secure by Letters Patent, is—

1. In combination with the axle and the axle-box of a carriage-wheel, two resisting-springs, confined respectively at their outer and inner ends, substantially in the manner herein described, and operating in opposite directions against the thrusts of the intervening axle-box and of the axle, substantially as set forth.

2. Two springs, *c c'*, confined on a wheel-axle at opposite ends of the axle-box or hub, between shoulders *f f'* of the box and shoulders *d* and *g* on the axle, in combination with the intervening circumferential projection *b* of the axle-box bearing on the axle, substantially as described, and for the purpose specified.

3. The axle-box C, carrying springs *c c'*, in combination with the axle A, relatively constructed with shoulder-bearings for the ends of the springs and bearings for the axle-box on the axle, one of which is between the springs and the other at the outer part of the axle, substantially as described.

4. An axle, A, provided with inner and outer shoulders, *d g*, in combination with an axle-box, C, having springs *c c'* and shoulders *f f'*, all arranged and operating substantially as described, for the purposes specified.

5. The combination of a thimble, D, nut E, and spring *c'*, all applied upon the outer end of an axle, A, substantially as and for the purpose set forth.

WHEELER BEERS.

Witnesses:
EDWIN F. HALL,
T. L. HOLT.